Jan. 12, 1932.  F. O. HOAGLAND  1,840,361
SPINDLE ROTATING MEANS FOR MILLING MACHINES
Filed Aug. 30, 1927   2 Sheets-Sheet 2
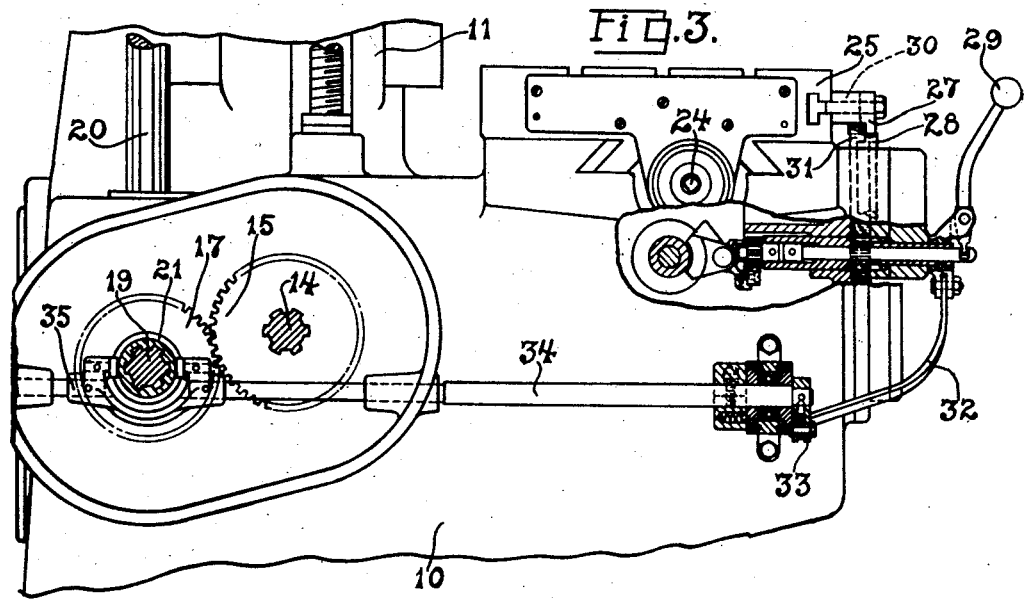
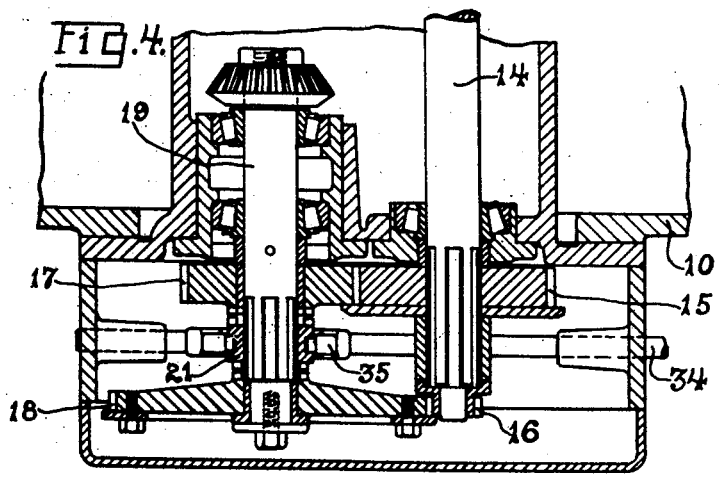
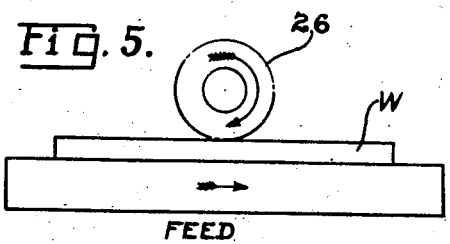
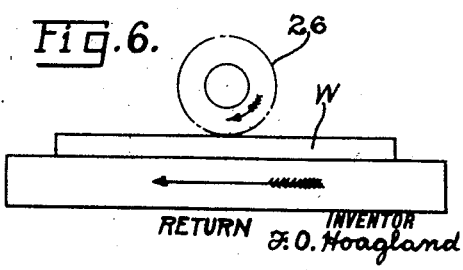
INVENTOR
F. O. Hoagland
BY
Joseph K. Schofield
ATTORNEY Patented Jan. 12, 1932

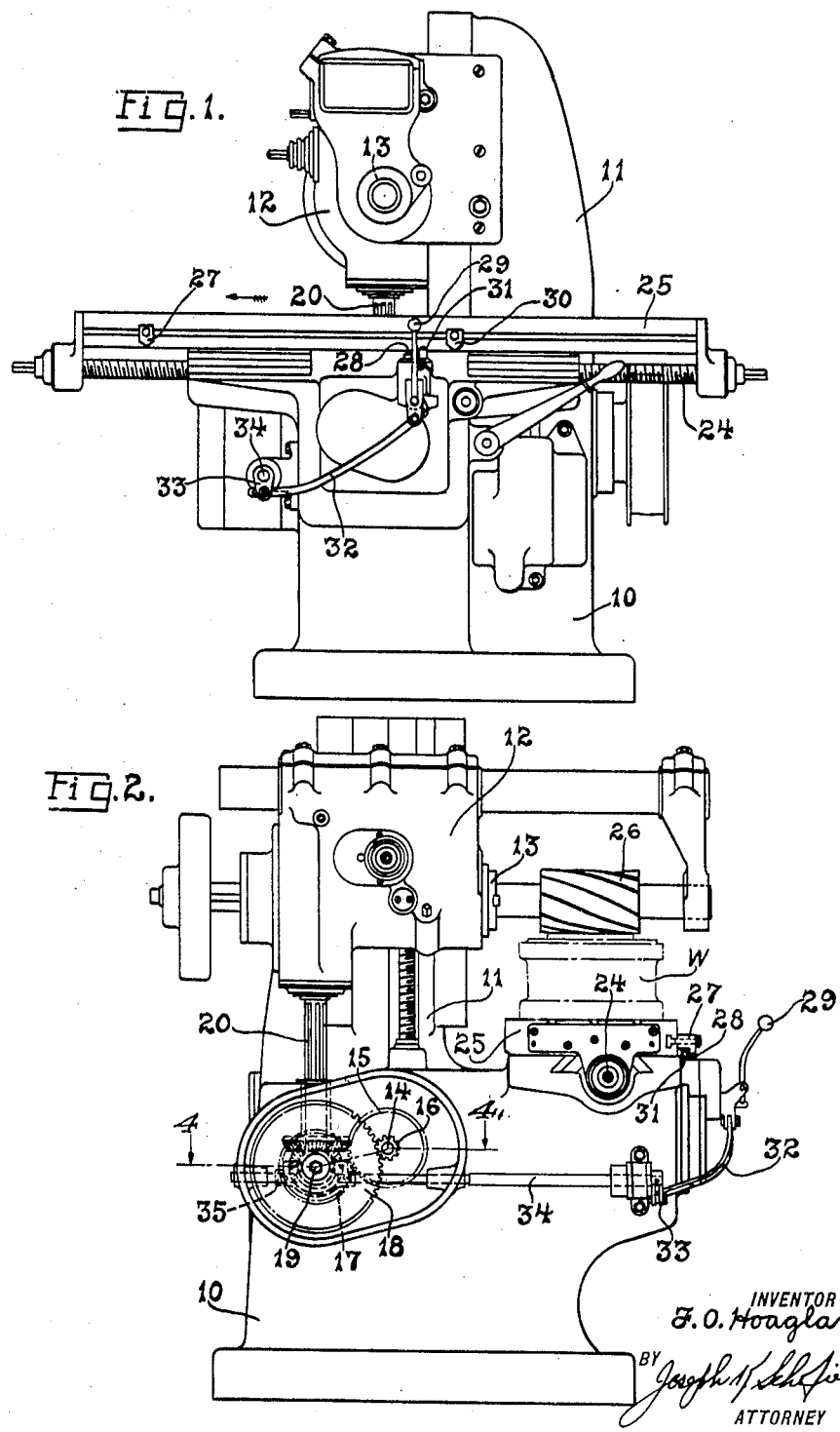

1,840,361

UNITED STATES PATENT OFFICE

FRANK O. HOAGLAND, OF BRIDGEPORT, CONNECTICUT, ASSIGNOR TO PRATT & WHITNEY COMPANY, OF NEW YORK, N. Y., A CORPORATION OF NEW JERSEY

SPINDLE ROTATING MEANS FOR MILLING MACHINES

Application filed August 30, 1927. Serial No. 216,483.

This invention relates to milling machines and in particular to means for rotating the cutter spindle and cutter so that they may be rotated at cutting speeds while the table is being slowly moved, and very slowly rotated during the rapid return movement of the table.

An object of the present invention is to provide a milling machine having automatic table feeding and traversing means with a mechanism, preferably operated from the feed control mechanism, to change the speed of rotation of the cutter spindle upon reversal of motion of the table.

Another object of the invention is to provide two driving connections for the cutter spindle adapting the spindle to be rotated at two widely different speeds, these speeds being connected and disconnected by means of a clutch member operated simultaneously with the table reversing mechanism.

Another object of the invention is to provide feeding means for a milling machine table adapted to feed the table slowly in one direction and to automatically reverse movement of the table at any predetermined point and return the table at a high rate of speed to its initial position, the clutch for rotating the cutter spindle at different speeds being operated simultaneously with the feed reversing mechanism.

With the above and other objects in view, my invention consists in the features of construction and operation set forth in the following specification and illustrated in the accompanying drawings.

In the accompanying drawings annexed hereto and forming a part of this specification, I have shown my invention embodied in a horizontal milling machine, but it will be understood that the invention can be otherwise embodied and that the drawings are not to be construed as defining or limiting the scope of the invention, the claims appended to this specification being relied upon for that purpose.

In the drawings:

Figure 1 is a front elevation of a complete milling machine provided with the present invention.

Fig. 2 is a side elevation of the machine.

Fig. 3 is an enlarged fragmentary side elevation, partly in section, showing the principal parts of the mechanism for simultaneously changing the cutter speed with reversal of the table movement.

Fig. 4 is a sectional view taken on line 4—4 of Fig. 2 showing the driving connections for the cutter spindle and the actuating clutch used in connection therewith.

Fig. 5 is a diagrammatic view of the table and cutter, their relative movements during the cutting operations being shown by the arrows, and Fig. 6 is a similar view of the movements of the table and cutter during the return traversing movement of the table.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: First, a base; second, a cutter head having a rotatably mounted cutter spindle therein; third, a work supporting table adapted to be reciprocated; fourth, means to move the table at a slow speed for feeding operations and at a high speed to traverse or return the table to its initial position; fifth, two driving connections for rotating the cutter spindle at different speeds; sixth, a clutch for connecting or disconnecting the driving connections for the cutter spindle; seventh, means for actuating said clutch by movement of the table reversing mechanism.

In semi-automatic milling machines it is usual to perform cutting operations upon work mounted upon a table while the table is being very slowly moved in one direction. During this very slow movement of the table the spindle and cutter are rapidly rotated at the usual cutting speeds. At the end of the cutting movement of the table it is usually returned to its initial position at which position the machine is stopped to permit the operator to remove the finished work and mount a new blank on the table. During this return movement of the table steps must be taken to prevent the cutter from cutting into or dragging over the finished work, either of which mars the smooth milled surface of the finished work. For this purpose it has heretofore been proposed to move the table directly away from the cutter so that the cutter does not contact with the work on the return stroke. Also it has been proposed to disconnect the driving means for the cutter spindle during the return movement of the table so that the cutter will not rotate during the return stroke of the table. This arrangement permits the cutter to drag over the work and for that reason is not wholly satisfactory.

In the present instance it is proposed to positively rotate the cutter spindle during the return stroke of the table at an extremely slow speed. The speed of the cutter spindle during this return stroke of the table would be regulated so that the rotative speed of the periphery of the cutter would correspond to the linear velocity of the table. The cutter therefore would, in effect, be rolled back along the finished work without cutting into or dragging over the work.

Referring more in detail to the figures of the drawings, I show a milling machine having a base 10, an integral column 11 extending upwardly from one side thereof on which may be adjustably mounted a head 12 within which is rotatably mounted a cutter spindle 13. In order to rotate this cutter spindle 13 a main drive shaft 14 is provided which may be rotated from any desired source of power and which is provided with two gears 15 and 16 of different size at its outer end. These two gears 15 and 16 are directly keyed or otherwise secured to the driving shaft 14. These gears 15 and 16 also are in mesh constantly with two gears 17 and 18 respectively rotatably mounted upon a second driving shaft 19 connected by means of bevel gears to an upright splined shaft 20 connected in any usual or conventional manner (not shown) to the cutter spindle 13 within the head 12. Disposed between the two rotatably mounted gears 17 and 18 on the second shaft 19 is a clutch member 21 splined to the shaft 19 so that by movement to one or the other of its operative positions it will engage one of the gears 17 or 18. By this means it will be seen, particularly by reference to Fig. 4, that when the clutch 21 is in its inner position the cutter spindle 13 will be rotated at a relatively high speed which is adapted for use during the cutting operation. With the clutch 21 in its outer position the cutter spindle 13 will be rotated at a greatly reduced speed but in the same direction as during the cutting.

Movable within suitable ways extending horizontally and transversely of the machine is a work supporting table 25 which is adapted to be moved by any conventional or usual means to feed work W mounted thereon past the cutter 26 on the spindle 13. As the feeding means for this table 25 are or may be similar to those shown in the patent to De Leeuw et al. 961,405, it is not thought that these will require further description. It will be sufficient to state that a rotatably mounted screw 24 is provided suitably secured to the table against endwise movement. Rotation of this screw 24 at different speeds and in opposite directions serves to properly move the table 25. Upon the table 25 reaching one limit of movement in one direction during which the cutting operation has taken place, a dog 27 thereon will depress a plunger 28 which will actuate reversing means to reverse the direction of movement of the table 25. This return movement of the table 25 may take place at a high or traversing speed. Also a hand lever 29, shown clearly in Figs. 2 and 3, may be utilized for this purpose to reverse the direction of movement of the table 25. As soon as the return movement of the table 25 has been completed a dog 30 strikes a second plunger 31 adjacent plunger 28 and stops further movement of the table 25.

Adapted to be connected to a short arm on the oscillating control lever 29 by a suitable elongated link 32 is a small arm 33 on the forward end of an oscillating shaft 34 extending along one side of the machine. Oscillation of the feed controlling lever 29 to reverse the direction of movement of the table 25 either manually by the hand lever 29 or through the adjustable dog 27 and plunger 28 will therefore oscillate this shaft 34. At the opposite end of the shaft 34 is a yoke member 35 engaging a peripheral groove in the cluth member 21 referred to above. Simultaneously with movement of the table reversing mechanism or operation of the reversing lever 29 the clutch 21 therefore will be moved from one operative position to the other. As shown in Fig. 1 the link 32 at the end connected to the short arm 33 is provided with an elongated slot so that the reversing mechanism can complete a portion of its movement before the shaft 34 is oscillated to actuate the clutch 21.

In operation, when the table 25 is moving in a direction to feed work W past the cutter and to perform cutting operations thereon, the speed of the table 25 is extremely slow and the speed of the milling cutter 26 and its spindle 13 is relatively fast, the speed depending upon the particular material and operation being performed. As soon, however, as the table 25 has been reversed to return the table to its initial position at its traversing speed, the clutch 21 will be thrown to its opposite operative position whereupon the cutter 26 will be rotated at an extremely slow speed, this speed being chosen so that in effect the cutter 26 will have a rolling movement relative to the piece being operated upon, thus preventing its cutting edges from scratching or cutting into the finished surface that has been milled. For different diameters of cutters 26 it is only necessary to provide the correct ratio between the gears 16 and 18 so that during the return movement of the table 25 the periphery of the cutter 26 will have a linear velocity equal to that of the table 25.

What I claim is:

1. A milling machine comprising in combination, a base, a cutter spindle thereon, a table, means to move said table in opposite directions on said base, means for controlling the movement of said table in opposite directions, positive means to rotate said spindle at two different speeds, means to rotate said spindle at one speed while said table is moving in one direction, means to rotate the spindle at the other speed while the table is moving in the opposite direction, and a unitary lever for simultaneously controlling the movements of said table and spindle.

2. A milling machine comprising in combination, a base, a cutter spindle thereon, a table, means to move said table in opposite directions on said base, means for controlling the movement of said table in opposite directions, positive means to rotate said spindle at two different speeds, means to rotate said spindle at its high speed while said table is moving slowly in one direction, means to rotate the spindle at its slow speed while the table is moving rapidly in the opposite direction, and a unitary lever for simultaneously controlling the movements of said table and spindle.

3. A milling machine comprising in combination, a base, a cutter spindle thereon, means to rotate said spindle, a table, means to move said table in opposite directions on said base, and driving connections to said table and spindle for rotating said spindle at a relatively high speed during movement of said table in one direction and for rotating the spindle at a relatively low speed during movement of said table in the opposite direction.

4. A milling machine comprising in combination, a base, a cutter spindle thereon, means to rotate said spindle, a table, means to move said table in opposite directions on said base, driving connections to said table and spindle for rotating said spindle to effect rotation of a cutter thereon at cutting speed during movement of said table in one direction, and to rotate said spindle during movement of said table in the opposite direction at a speed to effect rolling of the cutter along work on said table.

5. A milling machine comprising in combination, a base, a cutter spindle thereon, means to rotate said spindle, a table, means to move said table in opposite directions on said base, driving connections to said table and spindle for rotating said spindle at a relatively high speed during movement of said table in one direction and for rotating the spindle at a relatively low speed during movement of said table in the opposite direction, and controlling operation upon reversal of movement of said table to change the speed of said spindle.

6. A milling machine comprising in combination, a base, a cutter spindle thereon, means to rotate said spindle, a table, means to move said table in opposite directions on said base, and driving connections to said table and spindle for rotating said spindle at a high cutting speed during movement of said table in one direction at a slow feeding speed, and for rotating the spindle at a relatively low speed in the same direction during movement of the table in the opposite direction at a high traversing speed, the slow speed of the spindle being such that the linear velocity of a cutter thereon at its periphery substantially equals the rapid traversing speed of said table.

In testimony whereof, I hereto affix my signature.

FRANK O. HOAGLAND.